(12) United States Patent
Ueno et al.

(10) Patent No.: US 6,742,803 B2
(45) Date of Patent: Jun. 1, 2004

(54) AUTOMOBILE INTERIOR MEMBER WITH AIR BAG COVER PORTION

(75) Inventors: Shigehiro Ueno, Nishikasugai-gun (JP); Kenichi Furuta, Nishikasugai-gun (JP); Kazuo Suzuki, Nishikasugai-gun (JP); Norio Jogan, Nishikasugai-gun (JP); Tadamasa Kidera, Nishikasugai-gun (JP); Akiyoshi Nagano, Nishikasugai-gun (JP); Hideki Hayashi, Nishikasugai-gun (JP); Masanobu Tomida, Nishikasugai-gun (JP); Akio Nakano, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 219 days.

(21) Appl. No.: 10/023,743

(22) Filed: Dec. 21, 2001

(65) Prior Publication Data

US 2002/0079676 A1 Jun. 27, 2002

(30) Foreign Application Priority Data

Dec. 26, 2000 (JP) ........................... P. 2000-395903

(51) Int. Cl.[7] ........................... B60R 21/20; B60R 21/16
(52) U.S. Cl. ................................. 280/728.3; 280/732
(58) Field of Search .......................... 280/728.3, 732

(56) References Cited

U.S. PATENT DOCUMENTS

| | | | | |
|---|---|---|---|---|
| 5,172,931 A | * | 12/1992 | Baba et al. .............. 280/728.3 |
| 5,180,187 A | * | 1/1993 | Muller et al. ................ 280/732 |
| 5,215,330 A | * | 6/1993 | Kurita ...................... 280/728.3 |
| 5,393,089 A | * | 2/1995 | Pakulsky et al. ......... 280/728.3 |
| 5,394,602 A | * | 3/1995 | Czapp et al. .................. 29/460 |
| 5,427,408 A | * | 6/1995 | Ando et al. .............. 280/728.3 |
| 5,582,424 A | * | 12/1996 | Okuyama et al. ........ 280/728.3 |
| 5,779,262 A | * | 7/1998 | Totani et al. ............ 280/728.3 |
| 5,786,049 A | * | 7/1998 | Nusshor ..................... 428/35.2 |
| 5,839,752 A | * | 11/1998 | Yamasaki et al. ........ 280/728.3 |
| 5,865,461 A | * | 2/1999 | Totani et al. ............ 280/728.3 |
| 6,109,645 A | * | 8/2000 | Totani et al. ............ 280/728.3 |
| 6,595,543 B2 | * | 7/2003 | Desprez ................... 280/728.3 |

FOREIGN PATENT DOCUMENTS

| JP | 09-002188 | | 1/1997 |
|---|---|---|---|
| JP | 11-091484 | | 4/1999 |
| JP | 00-335346 | * | 12/2000 |

* cited by examiner

*Primary Examiner*—Ruth Ilan
(74) *Attorney, Agent, or Firm*—Posz & Bethards, PLC

(57) ABSTRACT

An automobile interior member which is represented by an instrument panel and to which an air bag device is to be assembled, is constituted by a main body portion and an air bag cover portion, the main body portion and the air bag cover portion being formed in a manner so that the main body portion is primarily molded (injection-molded) out of first thermoplastic resin material, and the air bag cover portion is secondarily molded (injection-molded) so as to be lapped with the main body portion on the back surface side. The second thermoplastic resin is oriented in a direction along a tear line (edges of rotational lid portions) of the lid portions (door portions) in the air bag cover portion so that the air bag cover portion is secondarily molded.

9 Claims, 6 Drawing Sheets

AUTOMOBILE INTERIOR MEMBER WITH AIR BAG COVER PORTION

CROSS REFERENCE TO RELATED APPLICATION

The present application is based on Japanese Patent Application No. 2000-395903, which is incorporated herein by reference.

BACKGROUND OF THE INVENTION

1. Field of the Invention

The present invention relates to an automobile interior member with an air bag cover portion to which an air bag device is assembled, such as an instrument panel, a door trim, a seat back, and the like.

Here, description will be made mainly on an instrument panel by way of example, but the present invention is not limited thereto.

If no particular definition is specified in the specification, the front, rear, right and left of an automobile interior member (instrument panel) are defined correspondingly to the front, rear, right and left of a real automobile on which the automobile interior member is mounted.

2. Description of the Related Art

In the background art, an instrument panel of this kind was constituted by a main body portion, and a bag cover portion which was provided with a mounting foot portion for mounting the bag cover portion on an air bag casing. The main body portion and the bag cover portion were molded separately and then assembled integrally in a post-process so as to form the instrument panel.

However, in the conventional method, a mold can not utilized in common, and man-hours for molding and man-hours for assembling are increased.

In order to solve the above-mentioned problems, for example, a variety of members formed by dichromatic molding have been proposed as follows (in JP-A-9-2188, JP-A-11-91484 and the like).

After a main body portion is injection-molded (primarily molded) out of rigid plastic material (first thermoplastic resin material) such as PP-F (fiber reinforced polypropylene) or the like, a bag cover portion is injection-molded (secondarily molded) out of flexible plastic material (second thermoplastic resin material) such as TPO (olefin type thermoplastic elastomer) or the like, by use of one and the same mold as that for the main body portion, so that the main body molded portion and the bag cover portion are welded integrally with each other.

Generally, in view of the breakage property of a tear line (breakage line), the tear line serving as a portion for partitioning a lid portion of the bag cover is constituted by a main groove portion formed in the inside and a sub-groove portion (relief line) formed in the outside.

Recently, with respect to design performance, a so-called relief-lineless type, where the tear line (breakage line) serving as the portion for partitioning the lid portion does not appear on the surface (design surface) side namely the relief line is not formed in the surface side, is strongly demanded.

However, when the relief-lineless request was to be fulfilled, an extra number of man-hour such as post-processing or the like was required for obtaining predetermined breakage load properties (tear property) of the tear line (breakage line).

SUMMARY OF THE INVENTION

In consideration of the above-mentioned problems, an object of the present invention is to provide an automobile interior member with an air bag cover portion such as an instrument panel or the like, in which predetermined breakage load properties can be obtained easily, and making relief-lineless in the air bag cover portion can be made easily without taking any special measure such as post-machining or the like on the tear line.

In order to solve the problems as described above, as a result of making every endeavor to eagerly develop a new interior member, the inventors have conceived an automobile interior member with an air bag cover portion in the following configuration.

That is, an automobile interior member with an air bag cover portion, in which an air bag device is to be mounted, is constituted by a main body portion and the air bag cover portion, the main body portion and the air bag cover portion being formed in a manner so that the main body portion is formed out of a first thermoplastic resin, and the air bag cover portion is formed out of a second thermoplastic resin so as to be welded integrally with the main body portion; wherein the second plastic resin is oriented in a direction along a tear line portion(a main breakage line: a end edge of a rotational lid portion) serving as the end edge of the lid portion in the air bag cover portion so that the air bag cover portion is formed.

More specifically, an automobile interior member with an air bag cover portion, to which an air bag device is assembled, is constituted by a main body portion and the air bag cover portion, the main body portion and the air bag cover portion being formed by molding in a manner so that the main body portion is primarily molded out of a first thermoplastic resin, and the air bag cover portion is secondarily molded so as to be welded integrally with the main body portion; wherein a gate portion of the air bag cover portion is positioned in a direction so that the gate portion intersects a tear line portion (a end edge of a rotational lid portion) serving as the end edge of the lid portion; and wherein a guide rib for guiding material flow from the gate portion in a direction along the tear line portion is formed on a back surface of the air bag cover portion.

In the bag cover portion of the automobile interior member with the air bag cover portion such as an instrument panel or the like, the material flow is oriented along the tear line portion, in the same manner as that in the above configuration. As a result, the inventors have discovered a fact that predetermined breakage load properties can be obtained easily, and making relief-lineless can be made easily without taking any special measure such as post-machining or the like on the tear line.

It is supposed that the load for opening the lid portion at a moment when an air bag is operated depends mainly on the breakage property (breakage load) of the tear line portion that serves as a breakage start portion (initial breakage portion).

That is, after the initial breakage portion (tearing start portion: slit) has been formed at a portion of the tear line portion by the expansion and deployment pressure of the air bag, the tearing (breakage) proceeds from the initial breakage portion as the start point to thin-walled portions (the tear line portion and sub-tear lines that constitute the edges of the lid portion on the opposite sides), so that the lid portion is opened. The tearing load for making the tearing proceed may be considerably lower than the breakage load (tearing load) for forming the initial breakage portion (tearing start portion).

Accordingly, it is supposed that even when the material flow in the bag cover portion is positioned in a direction so that the material flow intersects the sub-tear lines, no problem occurs in the breakage property (separating property: tear property).

In the above-mentioned configuration, the guide rib is generally formed (1) in a mode in which the guide rib is disposed to extend from a position where the gate portion is located to a position of an end of the tear line portion (a position corresponding to the arrangement of the tear line portion), or (2) in a mode in which the guide rib is disposed to extend from a position of the gate portion to a position beyond the position of the end of the tear line portion (corresponding to the arrangement of the tear line portion), so that openings are formed in the symmetrical positions with respect to the tear line portion.

Further, in each of the modes described above, a hook portion is preferably formed at the top end of the guide rib for the following reasons. That is, the flow direction of the material can be easily controlled, and in the case of the mode (1), a phase difference in the material flow is generated on the tear line due to the existence of the hook portion to thereby bring more improvement in the breakage property.

Furthermore, when reliable tearing of the breakage line for opening is required, the basic idea of the automobile interior member with an air bag cover portion according to the present invention is also applicable to an injection-molded article which includes a first portion as main body of the injection-molded article and a second portion having a tear line for opening, the second portion being broken at a predetermined load so as to form an opening portion in an inside of the first portion; wherein the injection-molded article is formed in a manner so that the first portion of the injection-molded article is primarily molded out of a first thermoplastic resin, and the second portion is secondarily molded so as to be welded integrally with the first portion; and wherein molding material flow is directed in a direction along the tear line for the opening portion in the second portion so that the second portion is secondarily molded.

DETAILED DESCRIPTION OF THE PREFERRED EMBODIMENTS

Taking an instrument panel as an example, an embodiment of the present invention will be described below.

Figure 1:
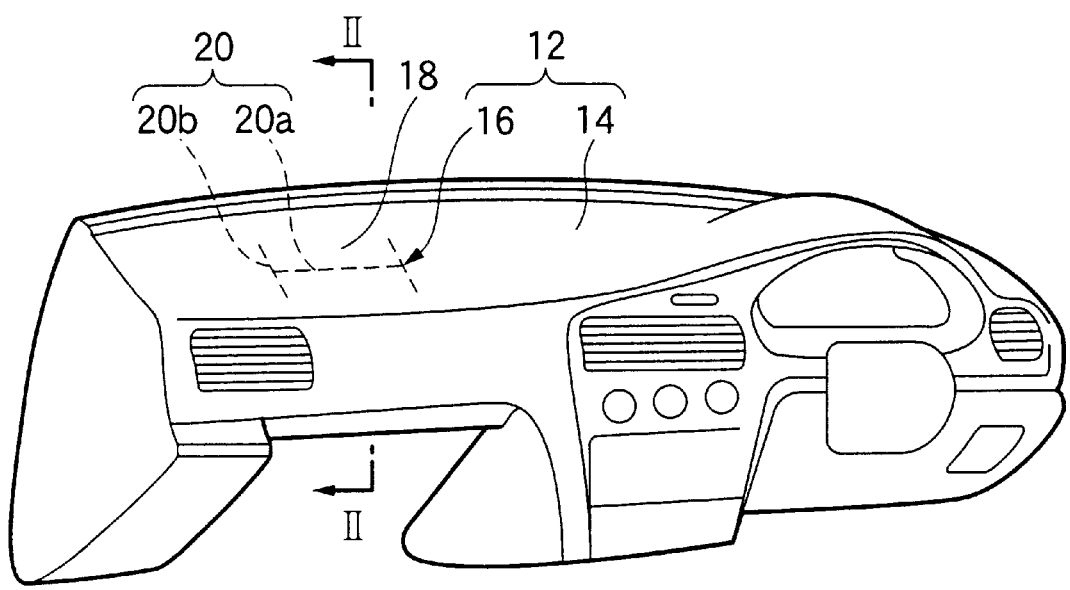
FIG. 1 is a perspective view showing a mode of assembling an instrument panel to which an automobile interior member with an air bag cover portion according to the present invention is applied.
Figure 2:
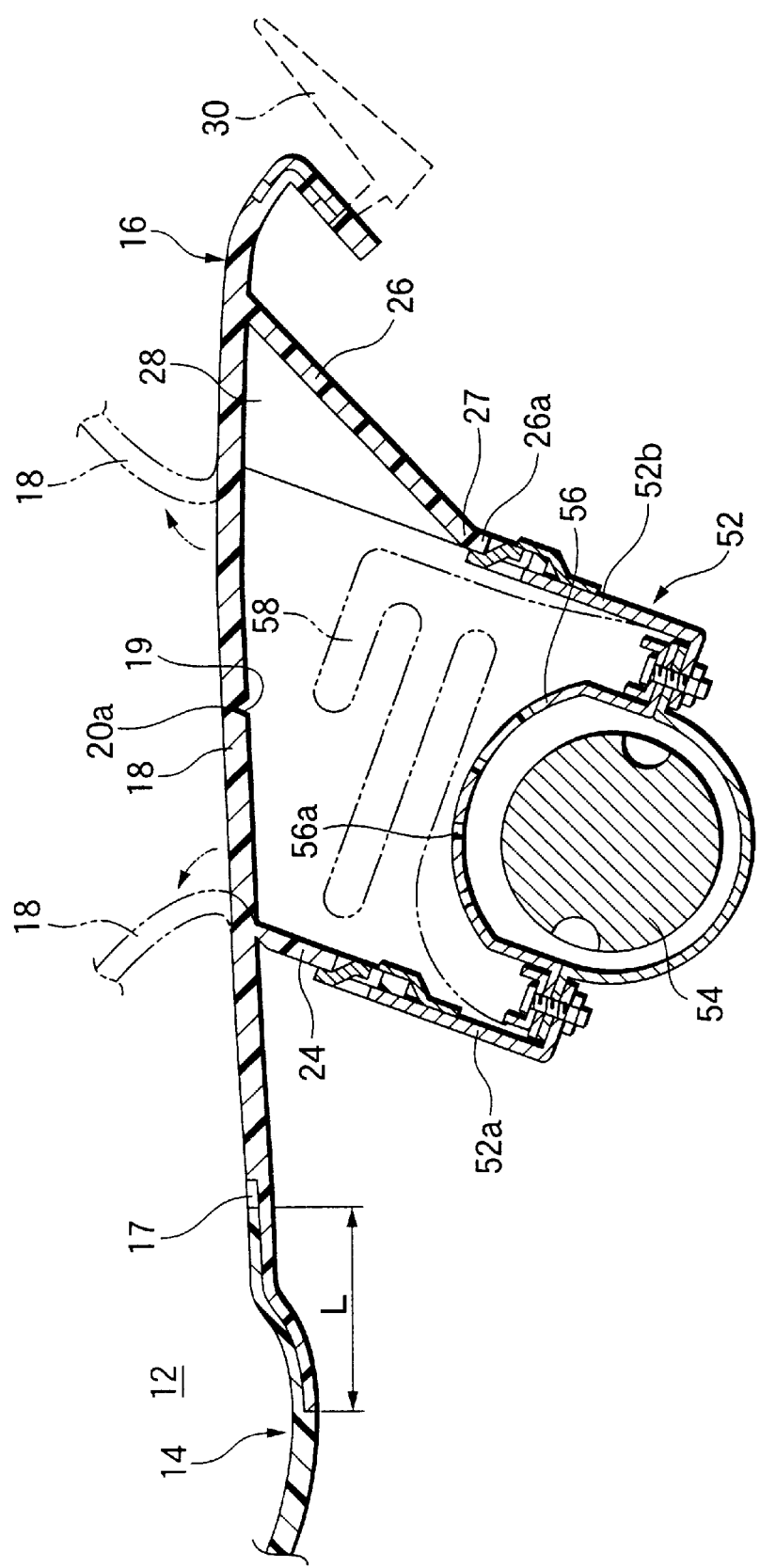
FIG. 2 is a schematic sectional view of a portion taken along the line II—II of FIG. 1.

An instrument panel 12, to which the present invention is applied, has such a configuration as shown in FIGS. 1 and 2.

The instrument panel 12 is formed by a dichromatic molded article which includes a main body portion of an interior member (referred to as main body portion) 14 primarily molded out of first thermoplastic resin material, and a bag cover portion 16 secondarily molded so as to be welded integrally with the main body portion 14.

According to the embodiment, the bag cover portion 16 is welded integrally with the main body portion 14 so as to be partially overlapped with the back surface side of the main body portion 14 around the whole circumference of the bag cover portion 16. The overlapped portion may be provided partially on the circumference of the bag cover portion. That is, it may be possible if the bag cover portion 16 is partially overlapped with the main body portion 14 in the portion which forms a material guide rib 31 guiding the material flow from a gate portion 30, which will be described later, in a direction along a main tear line 20a.

More specifically, the bag cover portion 16 is provided with an H-shaped tear line 20 for forming lid portions 18 capable of being opened in a manner of double-door outward opening (the doors at both sides are opened) at the moment when air bag is operated, i.e., at the moment of expansion and deployment of the air bag. Here, the tear line 20 is generally formed by a tear line-forming groove (tearing groove) 19 which is formed in the back surface of the bag cover portion 16. However, with respect to design performance (a request for a relief-lineless design or the like), when the relief-lineless design is not required, the tear line 20 may be formed in the front surface or in the back and front surfaces.

Of course, the present invention is applicable to the case in which a lid portion is formed for one-door opening, i.e. the tear line is formed into a U shape (into a channel shape).

Here, the tear lines 20 are constituted by a main tear line 20a and sub-tear lines 20b. The tear line that constitutes end edges of the door portions 18 respectively is defined as the main tear line 20a, while tear lines that constitute opposite sides (which intersect perpendicularly to the end edges) of the lid portions (door portions) 18 are defined as the sub-tear lines 20b.

On the back surface side of the bag cover portion 16, there provided front and rear mounting walls 24 and 26 which are attached to an air bag casing 52. Further, the rear mounting wall 26 is provided with a hinge portion 27 in the middle and a casing-attaching portion 26a at the top end side. Between the foot side from the hinge portion 27 of the rear mounting wall 26 and the back surface side of the bag cover portion 16, there are provided a plurality of reinforcement rib plates 28 for reinforcing the rear mounting wall 26 and for guiding the projecting direction of the bag. Although not shown in FIG. 2, generally, the front and rear mounting walls 24 and 26 are constituted by a cylindrical member having right and left side walls connected to each other.

In order to ensure the form retention property and the high temperature resistance property of first thermoplastic resin material for forming the main body portion 14 (material for the main body portion), for example, reinforcement filler-mixed plastic material such as fiber reinforced polypropylene (PP-F) or the like having a modulus of bending elasticity (ASTM D790) of 2,000 MPa or more, is used as the first thermoplastic resin material.

Also, in order to ensure the hinge characteristic, elasticity and a predetermined tensile strength are required of second thermoplastic resin material for forming the bag cover portion 16 (material for the cover portion). For example, when the main body portion is molded out of PPF or the like, there is used a nonpolar thermoplastic elastomer (TPE) having tensile strength (ASTM D638) of 5–50 MPa (preferably, 5–20 MPa) such as olefin type (TPO) or styrene type (TPS) or the like, which is capable of being welded (mainly heat-sealed) with the material for the main body portion, and which is light in weight and good in weather resistance. Particularly, in these materials, TPO is preferable to TPS, because TPO which is polyolefin resin (crystal phase) and the constraint phase of which is crystalline has higher orientation, compared with TPS which is polystyrene and the constraint phase of which is amorphous. Due to a fact that the degree of orientation in the bag cover portion 16 is increased, as an effect of the embodiment, the breakage property (tear property) in the main tear line 20a is increased.

In the case of PP-GF (glass fiber reinforced PP), a modulus of bending elasticity thereof is 2,350 MPa; and in the case of olefin type TPE (TPE), tensile strength thereof is 10 MPa.

With the foregoing configuration, in the instrument panel 12 according to the embodiment, the direction of the molding material flow of the bag cover portion 16 is oriented in a direction along the main tear line (main breakage line) 20a which constitutes end edges of the lid portions (door portions) 18 respectively at rotation so that the bag cover portion 16 is secondarily molded (see FIGS. 3, FIGS. 4A to 4C and FIGS. 5A to 5C).

Specifically, the description is made as follows.

Figure 3:
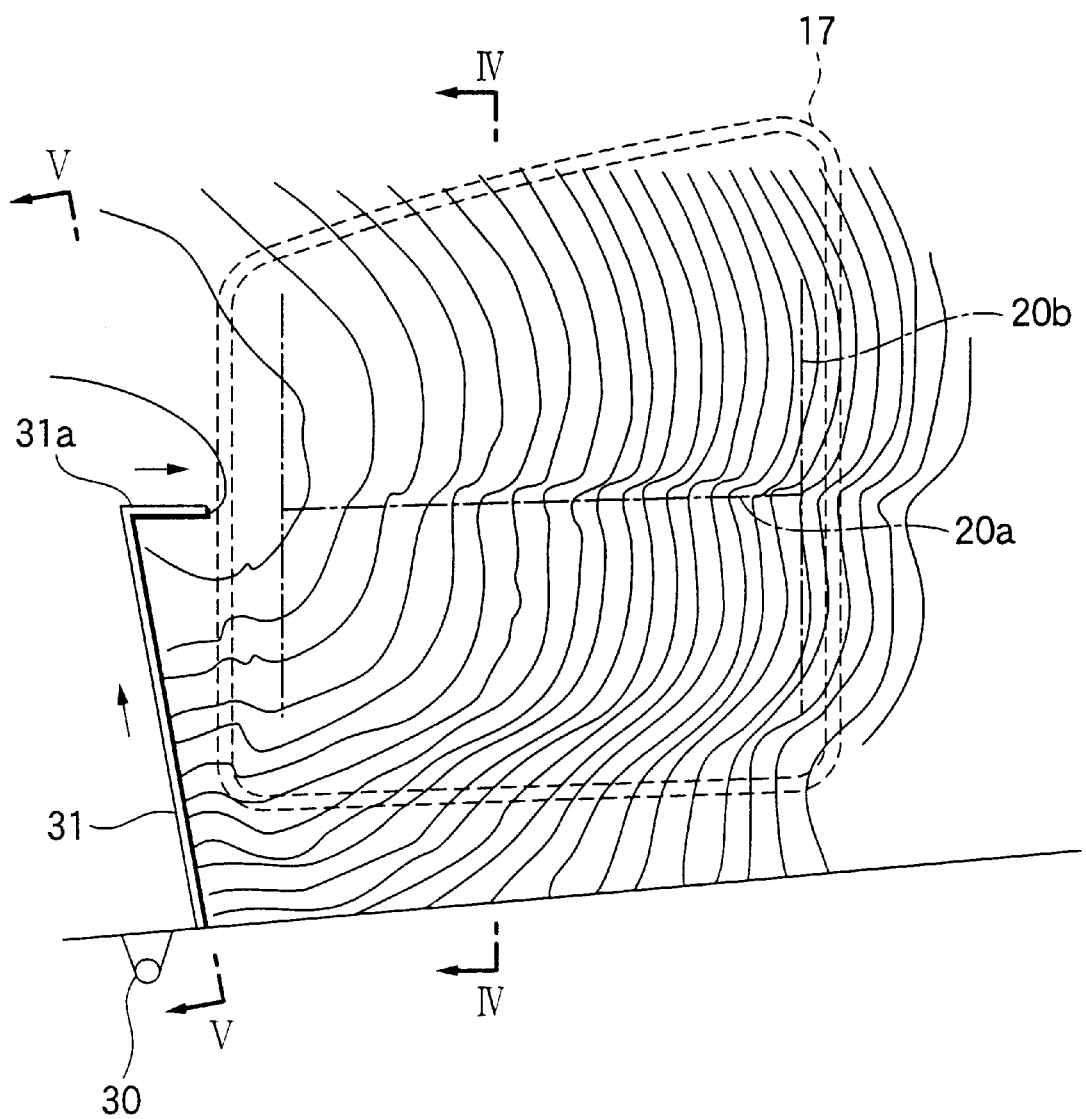
FIG. 3 is a schematic view showing a model of the back surface of a bag cover portion according to an embodiment of the present invention.

The material outflow direction of a gate portion 30 of the bag cover portion 16 in the instrument panel 12 is a direction in which the material flow intersects (perpendicularly to) the main tear line 20a of the lidportions 18 (as shown in FIG. 3). Since the instrument panel 12, i.e., the main body portion 14 of the molded article (main body portion of the instrument panel) 14 is a long-size molded article with a frontage which is larger in size than its depth, it is not reasonable to dispose the gate portion 30 in a direction parallel with the main tear line 20a. This is because the bag cover portion 16 is required to be laid up to the opposite sides of the main body portion 14 in the back surface side of the main body portion 14 (resulting in a waste of the material for the cover portion).

Herein, although the intersecting angle between the gate portion 30 and the main tear line 20a is not particularly limited, generally, the intersecting angle therebetween is 45°–135° (90°±45°)

In the embodiment, means for guiding the material flow from the gate portion 30 in a direction along the main tear line 20a is the material guide rib 31 that is formed (integral molding) on the back surface side of the bag cover portion 16. Although it is possible to use a mold such as a slide core or the like, it is preferred to use the material guide rib 31 because the structure of the mold will become complicated otherwise.

FIG. 3 shows a mode of the material guide rib 31. The material guide rib 31 is disposed to extend from the position of the gate portion 30 to a position of one end of the main tear line 20a (a position corresponding to the disposition of the main tear line 20a).

At the top end of the material guide rib 31 (the point whereat the flow direction of the material is changed), a hook portion 31a is formed, thought not essentially, to be bent to the side where the main tear line 20a is formed. As shown in the material flow simulation analysis in FIG. 3, with the main tear line 20a as the boundary, a phase difference in the waveform of the material flow of the cover portion is generated (faster at the upper side in FIG. 3) due to the existence of the hook portion 31a so that the directivity of the material flow is enhanced more. Each if the hook portion 31a is directed in a direction reverse to the direction of the example shown in FIG. 3, it is supposed that, in the similar manner, with the main tear line 20a as the boundary, a phase difference in the waveform of the material flow is generated (faster at the lower side in the FIG. 3) so that the directivity of the material flow is increased likewise.

Here, the thickness of the material guide rib 31 is generally selected in a range of from 1 mm to 2 mm without any particular limitation so long as a strength and effect to guide the material flow is obtained.

Figure 4A:
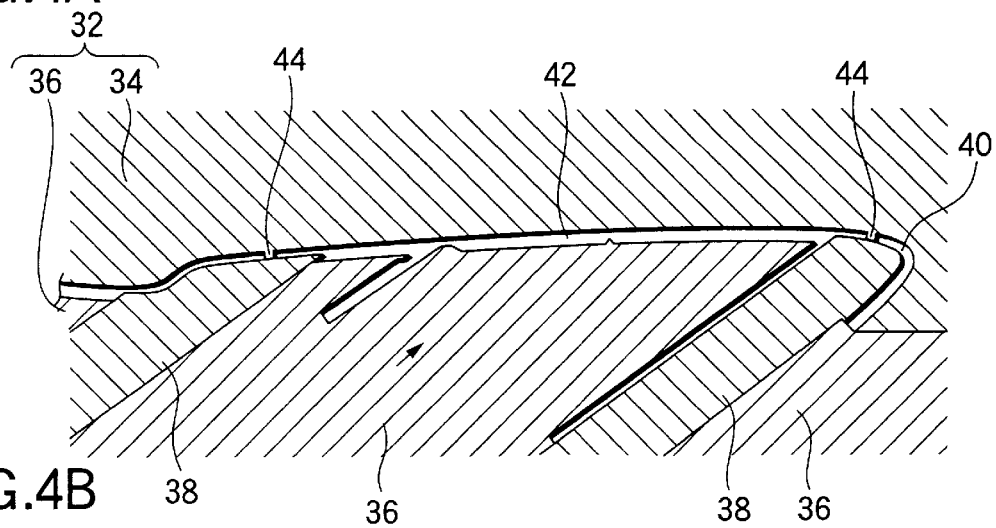
FIGS. 4A to 4C are schematic views of a mold used in molding steps of the instrument panel corresponding to the portions taken along the line IV—IV in FIG. 3.
Figure 4B:
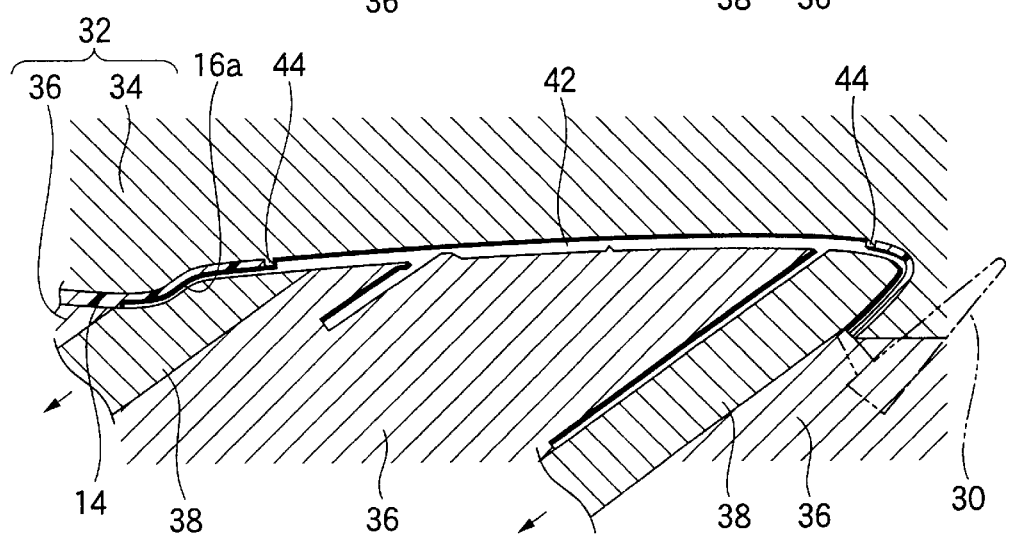
Figure 4C:
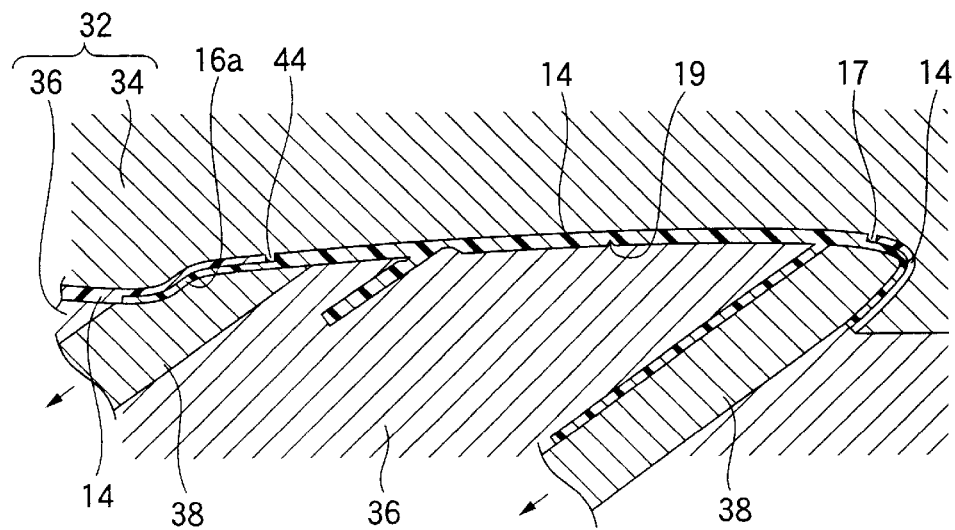
Figure 5A:
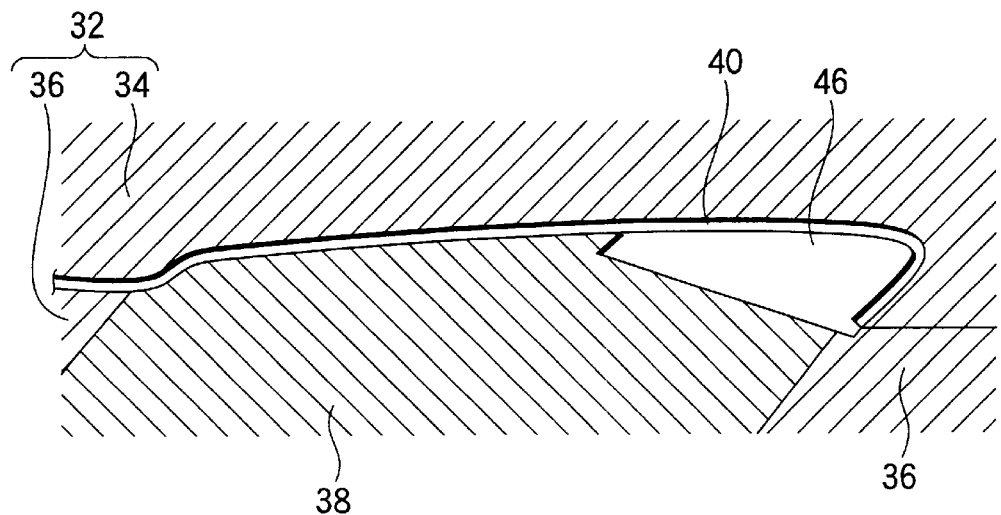
FIGS. 5A to 5C are schematic views of a mold used in molding steps of the instrument panel corresponding to the portions taken along the line V—V in FIG. 3.
Figure 5B:
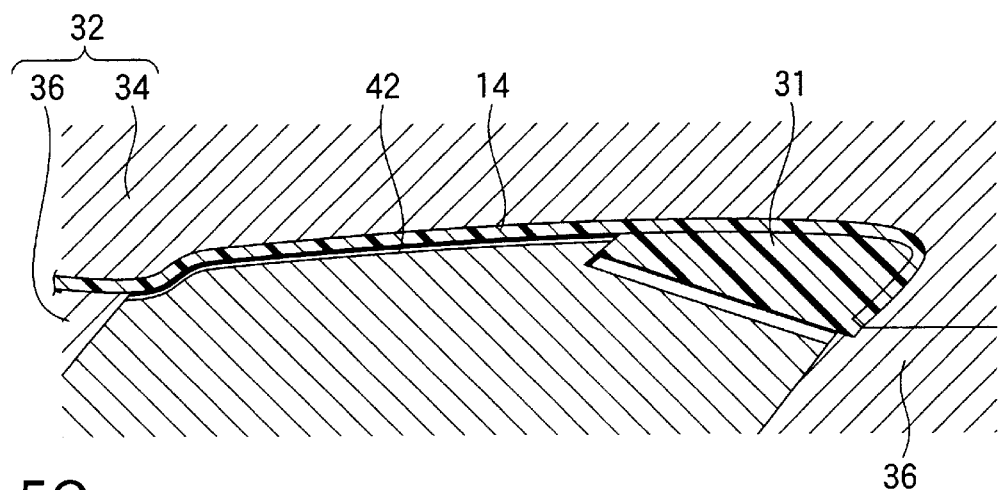
Figure 5C:
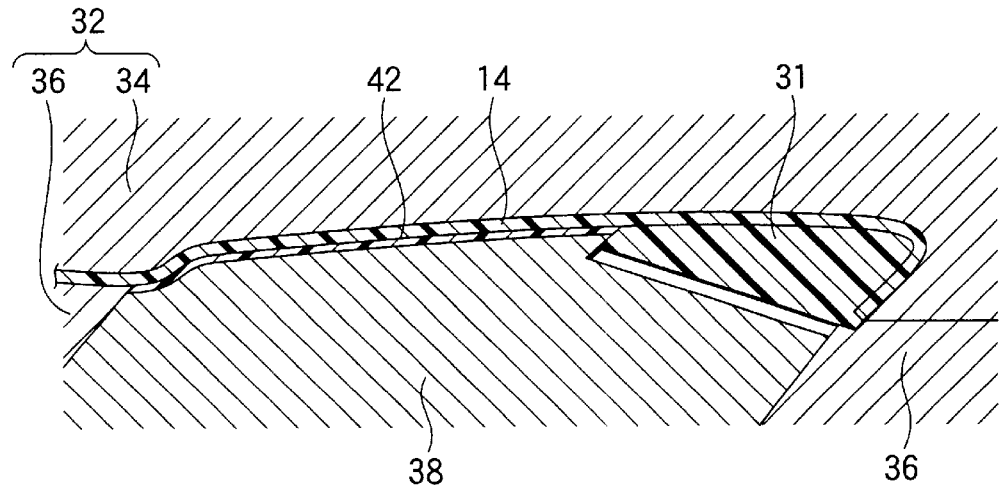

The instrument panel (automobile interior member) according to the embodiment is manufactured as follows by use of a single mold by dichromatic injection molding (see particularly FIGS. 4A to 4C and FIGS. 5A to 5C). FIGS. 4A to 4C are schematic views of a mold used in molding steps of the instrument panel corresponding to the section taken along the line IV—IV in FIG. 3. FIGS. 5A to 5C are schematic views of a mold used in molding steps of the instrument panel corresponding to the section taken along the line V—V in FIG. 3.

Basically, the manufacturing method of the instrument panel is constituted by the following steps. (1) A first injection molding step in which a cylindrical slide core 38 for shaping circumferential surfaces of the mounting walls 24 and 26 is made to proceed to form a cavity 40 for the main body portion in a molding mold 32, and then, first thermoplastic resin material is injected into the cavity 40 for the main body portion to thereby mold the main body portion 14. (2) A second injection molding step in which the slide core 38 is made to move back to form a cavity 42 for the cover portion, and then, second thermoplastic resin material is injected into the cavity 42 for the bag cover portion to thereby mold the bag cover portion 16. Further specific description will be made below.

The molding mold 32 is constituted by a fixed mold part (female mold part) 34 and a movable mold part (male mold part) 36. A material flow path (not shown) is formed from the fixed mold part 34 side toward the movable mold part 36 side.

According to the embodiment, as an interior member surface shaping mold part of the mold 32, i.e., as the fixed mold part (female mold part) 34, a mold part provided with a circular material break down protrusion 44 for shaping a relief groove, which is brought into contact with the surface of the slide core 38 when the slide core 38 is made to proceed, is used.

The width (thickness) of the top end of the material break down protrusion 44 may be selectable appropriately in a range of from a certain thickness which is at least large enough to prevent the protrusion 44 from being damaged or deformed when the slide core 38 is brought into contact therewith after the mold is finished or when injection molding is carried out, to a certain thickness which at most ensures the relief characteristic of the relief groove 17 formed in the surface of a molded article. For example, when the thickness in other general portion is 3 mm more or less, generally, the width b of the top end of the material break down protrusion 44 is 0.5–5 mm, preferably 1–3 mm.

First, as shown in FIG. 4A, in a state that the slide core 38 is at the front dead center, the movable mold part 36 is moved in the direction of the white arrow toward the fixed mold part 34. As a result, the circular material break down protrusion 44 for shaping the relief groove 17 formed in the fixed mold part 34 which is the interior member surface shaping mold part is brought into surface contact with the slide core 38, and the cavity 40 for the main body portion is formed in the molding mold 32. That is, the molding mold 32 is configured such that the materials for the main body portion 14 and for the bag cover portion 16 are broken down.

At this time, in a portion for forming the material guide rib 31, as shown in FIG. 5A, in the back surface of the bag cover portion 16, a cavity 46 for a rib portion is formed so as to communicate with the cavity 42 for the main body portion.

In this state, in the cavity 40 for the main body portion, via a gate (not shown), the first thermoplastic resin material (FPP) is injected to form the main body portion 14 by injection molding (as shown in FIG. 4A). At this time, as shown in FIG. 5B, the material guide rib 31 is formed on the back surface of the main body portion 14 of the molded article.

At this time, the material portioning protrusion 44 shapes the external circumferential surface of the relief groove 17 in the portion in which the bag cover portion and the main body portion 14 of the molded article are formed. At this time, there is a possibility that the injected material flows into a contact surface (PL surface) between the material break down protrusion 44 and the slide core 38 to thereby generate burr.

However, since the burr is positioned in the bottom portion of the relief groove 17, it is not conspicuous so that the design performance of the instrument panel surface is not spoiled. That is, not only in the case where the width of the top end is narrow but also in the case where the width of the top end is wide, the burr is hardly recognized visually by eye observation with ordinary attention because the burr is formed along the ridge between the opposite sides.

When the first thermoplastic resin material (fiber reinforced PP) has been slightly hardened, the slide core 38 is moved back to form the cavity 42 for the bag cover portion. Then, the second thermoplastic resin material (TPO), which is capable of being heat-sealed with the first thermoplastic resin material, is injected into the cavity 42 to form the bag cover portion 16 by injection molding (as shown in FIGS. 4C and 5C).

At this time, the cavity 42 for the cover portion is configured so that the bag cover portion 16 is provided with an overlapping portion 16a to be overlapped with the main body portion 14 of the molded article. Accordingly, the bag cover portion 16 is integrated with the main body 14 via the overlapping portion 16a by heat sealing.

As shown in FIG. 3, after the cover portion material flows into the outside of the material guide rib 31 while being guided into the back surface of the main body portion 14 by the material guide rib 31 formed on the back surface of the main body portion 14, the material flows through the opening in a direction along the main tear line 20a. As described above, the material flows while generating a phase difference on the tear line 20a. At this time, although a slight gap is formed between the material guide rib 31 and the slide core 38, the gap is small (for example, approximately ⅓ or less of the average height) compared with the height of the material guide rib 31. Hence, the quantity of the material that flows out through the gap is small. The main flow of the material is changed to a direction substantially parallel to the main tear line 20a at the position of the main tear line 20a.

On this occasion, the overlapping width L of the circumferential area of the bag cover portion 16 with the back side of the main body portion 14 is 10–50 mm, preferably, 20–40 mm. When the overlapping width L is too small, the welding strength is hardly ensured. On the other hand, when the lapping width L is too large, both the material cost and the weight of the instrument panel 12 are increased undesirably. Further, the thickness of the main body portion 14 is 3.0–4.0 mm; the thickness of the bag cover portion 16 is 3.0–4.0 mm.

When TPO is used as the material for the bag cover portion 16, the thickness of the main tear line 20a portion (the remaining thickness of the tear line-forming groove 19 portion) in the bag cover portion 16 is generally 0.8 mm more or less. When the remaining thickness is too small, sink or uneven luster is easily generated in the tear line-forming groove 19 due to the difference in the thickness.

After the main body portion 14 and the bag cover portion 16 have been hardened sufficiently, the movable mold part 36 is moved back so that the mold is opened. By use of an ejector pin (not shown), the instrument panel (molded article) 12 is pushed out so as to be released from the mold. After the molded article is released from the mold, the gate portion is removed.

In the instrument panel 12 molded as described above, the second thermoplastic resin material is oriented in a direction along the main tear line 20a formed by the lid portions (door portions) 18 in the bag cover portion 16. Accordingly, since the breakage property of the main tear line 20a is improved, it is not necessary to form any relief line corresponding to the main tear line 20a.

Further, a joined portion between the main body portion 14 and the bag cover portion 16 in the front surface side, i.e., a part line portion (PL portion) is positioned in the bottom portion of the relief groove 17. Accordingly, even when burr is generated in the PL portion, it is not conspicuous so that the design performance of the instrument panel 12 is hardly spoiled.

After the mounting walls are assembled to the front and rear supporting walls 52a and 52b of the bag casing 52, the instrument panel 12 configured as described above is retained on a vehicle body in the vicinity of the bag cover portion 16 of the instrument panel 12, in the same manner as the conventional art. The other portions of the instrument panel 12 are retained on and fixed to the mounting bracket or the like provided by the vehicle body (not shown) by means of screws or the like.

When the instrument panel 12 is mounted in the automobile, predetermined instruments and so on are disposed in the instrument panel 12.

At a predetermined timing, when gas is emitted from an inflator 54, the gas flows into an air bag 58 via gas delivery ports 56a in a diffuser can 56. The air bag 58 breaks the tear lines (tear line-forming groove 19) 20 portion, and the lid portions 18 and 18 are rotated around the hinge portions to be opened, so that the air bag 58 expands largely.

At this time, since the main tear line 20a lies in the flow direction of the material, the breakage can be performed smoothly even without any relief line.

Figure 6:
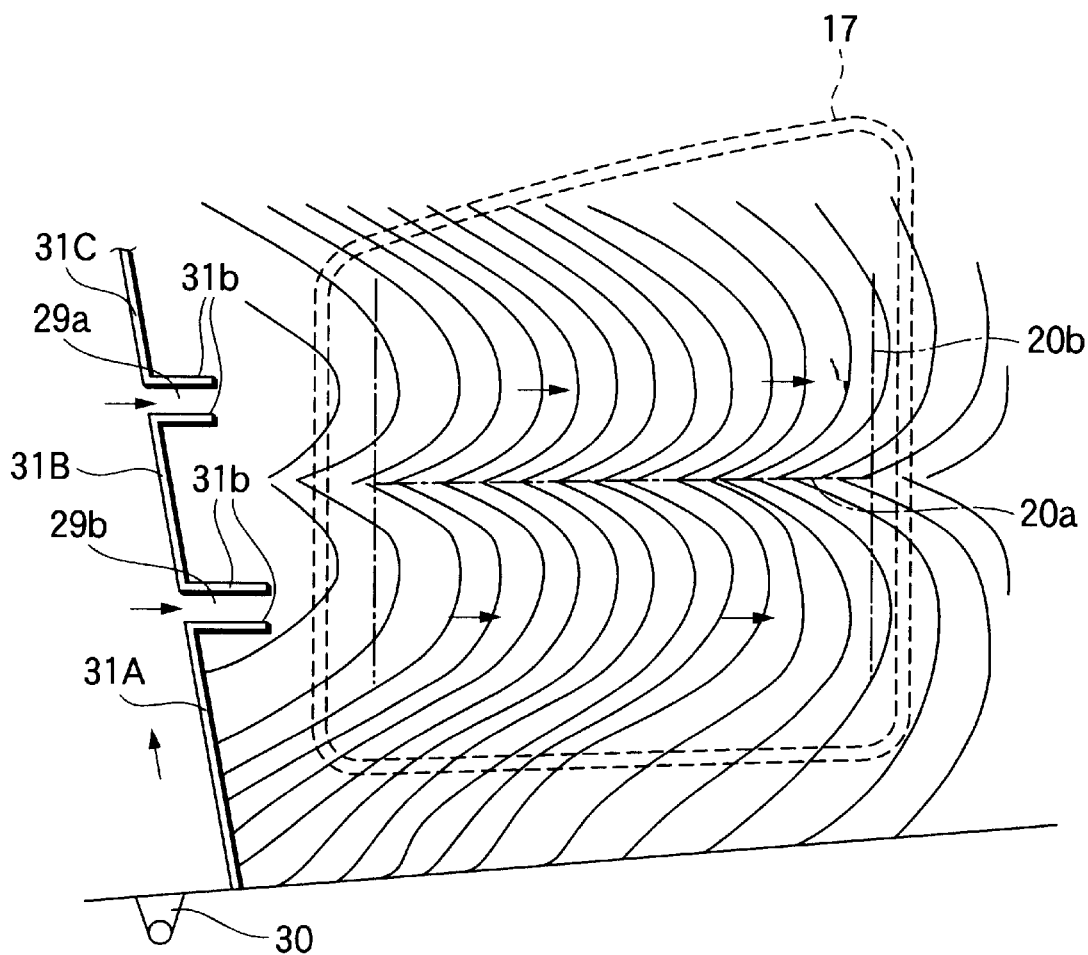
FIG. 6 is a schematic view showing a model of the back surface of a bag cover portion according to another embodiment of the present invention.

FIG. 6 shows another mode of the material guide rib. A group of material guide ribs 31A, 31B and 31C is disposed to extend from the position of the gate portion 30 to a position beyond one end of the main tear line 20a. Material flow ports 29a and 29b having the main tear line 20a held therebetween are formed, and a welded portion of the material for the cover portion is positioned on the main tear line 20a. As a result, the breakage property of the main tear line is increased. However, welded lines are apt to be generated apparently in the main tear line. Also in this embodiment, the material outflow ports 29a and 29b are provided with hook portions 31b respectively so that the directivity of the material flow surely follows the main tear line 20a.

Although the above description has been made as to an instrument panel, the present invention is also applicable to a door trim, a seat bag or the like, other than the instrument panel, which are disposed so as to cover an air bag of an air bag device.

Further, in the above description, although the primary molding and secondary molding are carried out by use of one and the same mold, the primary molding may be carried out by use of another mold.

Furthermore, in the above description, the first thermoplastic resin material such as PP-F is injected during the primary injection molding step and the second thermoplastic resin material such as TPO is injected during the secondary injection molding step to thereby mold the bag cover portion. However, the first and second thermoplastic resin materials are not limited the above materials, but other resin materials can be utilized as long as the material can be formed by for injection molding. Also, it is not necessary that the first and second thermoplastic resin materials are the different types of material with each other.

What is claimed is:

1. An automobile interior member in which an air bag device is mounted, said automobile interior member comprising:

a main body portion formed out of a first thermoplastic resin; and an air bag cover portion formed out of a second thermo plastic resin so as to be welded integrally with said main body portion, said air bag cover portion including a lid portion and a tear line portion forming an end face of said lid portion when said cover portion is opened;

wherein a gate portion of said air bag cover portion is positioned in a direction so that material outflow direction of said gate portion intersects said tear line portion; and wherein said air bag cover portion is formed in such a manner that the second thermoplastic resin is oriented in a direction substantially along said tear line portion.

2. An automobile interior member in which an air bag device is mounted, said automobile interior member comprising:

a main body portion primarily molded out of a thermoplastic resin; and an air bag cover portion secondarily molded out of a second thermoplastic resin so as to be welded integrally with said main body portion, said air bag cover portion including a lid portion and a tear line portion forming an end face of said lid portion when said cover portion is opened;

wherein a gate portion of said air bag cover portion is positioned in a direction so that material outflow direction of said gate portion intersects said tear line portion; and wherein a guide rib for guiding material flow from said gate portion in a direction along said tear line portion is formed on a back surface of said air bag cover portion.

3. An automobile interior member according to claim 2, wherein said guide rib is extended from a position where said gate portion is located to a position corresponding to said tear line portion.

4. An automobile interior member with an air bag cover portion according to claim 3, wherein a hook portion is provided at a top end of said guide rib, so as to extend toward said tear line portion.

5. An automobile interior member according to claim 2, wherein said guide rib is disposed to extend from a position of said gate portion to a position beyond said position corresponding to said tear line portion, and where-in a pair of openings are formed to hold said tear line therebetween so that a welded portion is formed on said tear line portion.

6. An automobile interior member according to claim 5, wherein at least one of hook portions extended toward said tear line portion are formed around said openings respectively.

7. An injection-molded article comprising:

a first portion as main body of said injection-molded article and a second portion having a tear line for opening, said second portion being broken at a predetermined load so as to form an opening portion in an inside of said first portion;

wherein a gate portion of said second portion is positioned in a direction so that a material outflow direction of said gate portion intersects said tear line; and wherein said injection-molded article is formed in a manner so that said first portion is primarily molded out of a first thermoplastic resin, and said second portion is secondarily molded so as to be welded integrally with said first portion; and wherein molding material flow is directed in a direction along said tear line for said opening portion in said second portion so that said second portion is secondarily molded.

8. An automobile interior member according to claim 1, wherein said tear line portion is provided as a linear groove formed on a back surface of said air bag cover portion.

9. An automobile interior member according to claim 2, said guide rib is primarily molded out of said first thermoplastic resin integrally with said main body portion.

* * * * *